United States Patent
Kobayashi et al.

(10) Patent No.: US 8,036,100 B2
(45) Date of Patent: Oct. 11, 2011

(54) DIGITAL SIGNAL DEMULTIPLEXING APPARATUS AND DIGITAL SIGNAL MULTIPLEXING APPARATUS

(75) Inventors: Kiyoshi Kobayashi, Yokosuka (JP); Masazumi Ueba, Soraku-gun (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 231 days.

(21) Appl. No.: 12/441,981

(22) PCT Filed: Oct. 23, 2007

(86) PCT No.: PCT/JP2007/070651
§ 371 (c)(1),
(2), (4) Date: Mar. 19, 2009

(87) PCT Pub. No.: WO2008/050766
PCT Pub. Date: May 2, 2008

(65) Prior Publication Data
US 2009/0262758 A1    Oct. 22, 2009

(30) Foreign Application Priority Data

Oct. 24, 2006  (JP) ................................. 2006-288612

(51) Int. Cl.
*H04J 11/00* (2006.01)
(52) U.S. Cl. ...................................................... 370/210
(58) Field of Classification Search .......... 370/210–211, 370/343, 480–481, 532–542
See application file for complete search history.

(56) References Cited

U.S. PATENT DOCUMENTS
5,839,101 A * 11/1998 Vahatalo et al. .............. 704/226
(Continued)

FOREIGN PATENT DOCUMENTS
JP              10 93492        4/1998
(Continued)

OTHER PUBLICATIONS

Kobayashi, Kiyoshi et al., "FFT-Type Demultiplexer That Allows Arbitrary Frequency Assignments", The Institute of Electronics, Information and Communication Engineers, p. 251, 2007, (with English translation).

Takahata, Fumio et al., "A PSK Group Modem Based on Digital Signal Processing: Algorithm, Hardware Design, Implementation and Performance", International Journal of Satellite Communications, vol. 6, pp. 253-266, (1988).

(Continued)

*Primary Examiner* — Kwang B Yao
*Assistant Examiner* — Tung Q Tran
(74) *Attorney, Agent, or Firm* — Oblon, Spivak, McClelland, Maier & Neustadt, L.L.P.

(57) ABSTRACT

A digital signal demultiplexing apparatus that can demultiplex and a digital signal multiplexing apparatus that can multiplex signals of channels having arbitrary frequency intervals and bandwidths are provided. The digital signal demultiplexing apparatus performs discrete Fourier transform on an input signal, output samples existing within frequency bands of each channel from samples of the frequency domain, add samples such that the number of samples of each channel become a power of two, and performs, on the samples of each channel, discrete inverse Fourier transform of a length the same as the number of the samples. The digital signal multiplexing apparatus performs discrete Fourier transform of a length the same as the number of samples of an input signal for a predetermined period, outputs samples existing within frequency bands of each channel from samples of the frequency domain of each channel, and arrange the samples according to frequency assignment of each channel to perform discrete inverse Fourier transform.

4 Claims, 11 Drawing Sheets

U.S. PATENT DOCUMENTS

| | | |
|---|---|---|
| 6,714,529 B1 | 3/2004 | Tanabe et al. |
| 2007/0008818 A1* | 1/2007 | Doisy et al. .................. 367/90 |
| 2009/0238065 A1* | 9/2009 | Dapper et al. ............... 370/208 |

FOREIGN PATENT DOCUMENTS

| | | |
|---|---|---|
| JP | 2001 51975 | 2/2001 |
| JP | 2001 111639 | 4/2001 |
| WO | 2007 136010 | 11/2007 |

OTHER PUBLICATIONS

Brigham, E. Oran "The Fast Fourier Transform", Prentice-Hall, Inc., pp. 148-171 and 206-215, (1974).

U.S. Appl. No. 12/296,758, filed Oct. 10, 2008, Kobayashi, et al.

U.S. Appl. No. 13/013,355, filed Jan. 25, 2011, Kobayashi, et al.

* cited by examiner

DIGITAL SIGNAL DEMULTIPLEXING APPARATUS AND DIGITAL SIGNAL MULTIPLEXING APPARATUS

TECHNICAL FIELD

The present invention relates to a digital signal demultiplexing apparatus for collectively demultiplexing a frequency-multiplexed signal into a plurality of signals by digital signal processing, and to a digital signal multiplexing apparatus for collectively frequency-multiplexing a plurality of signals into a frequency-multiplexed signal by digital signal processing.

BACKGROUND ART

For configuring a demultiplexing apparatus for demultiplexing an input signal in which signals of a plurality of channels are frequency-multiplexed into individual signals and configuring a multiplexing apparatus for frequency-multiplexing signals of a plurality channels to output a multiplexed signal, the same number of filters and frequency conversion circuits as the number of channels become necessary. Thus, there is a problem in that apparatus size and adjusting parts of the apparatus increase. As a method for solving this problem, a digital signal demultiplexing apparatus and a digital signal multiplexing apparatus of collective processing type using digital signal processing circuits are used (refer to non-patent document 1, for example).

Figure 7:
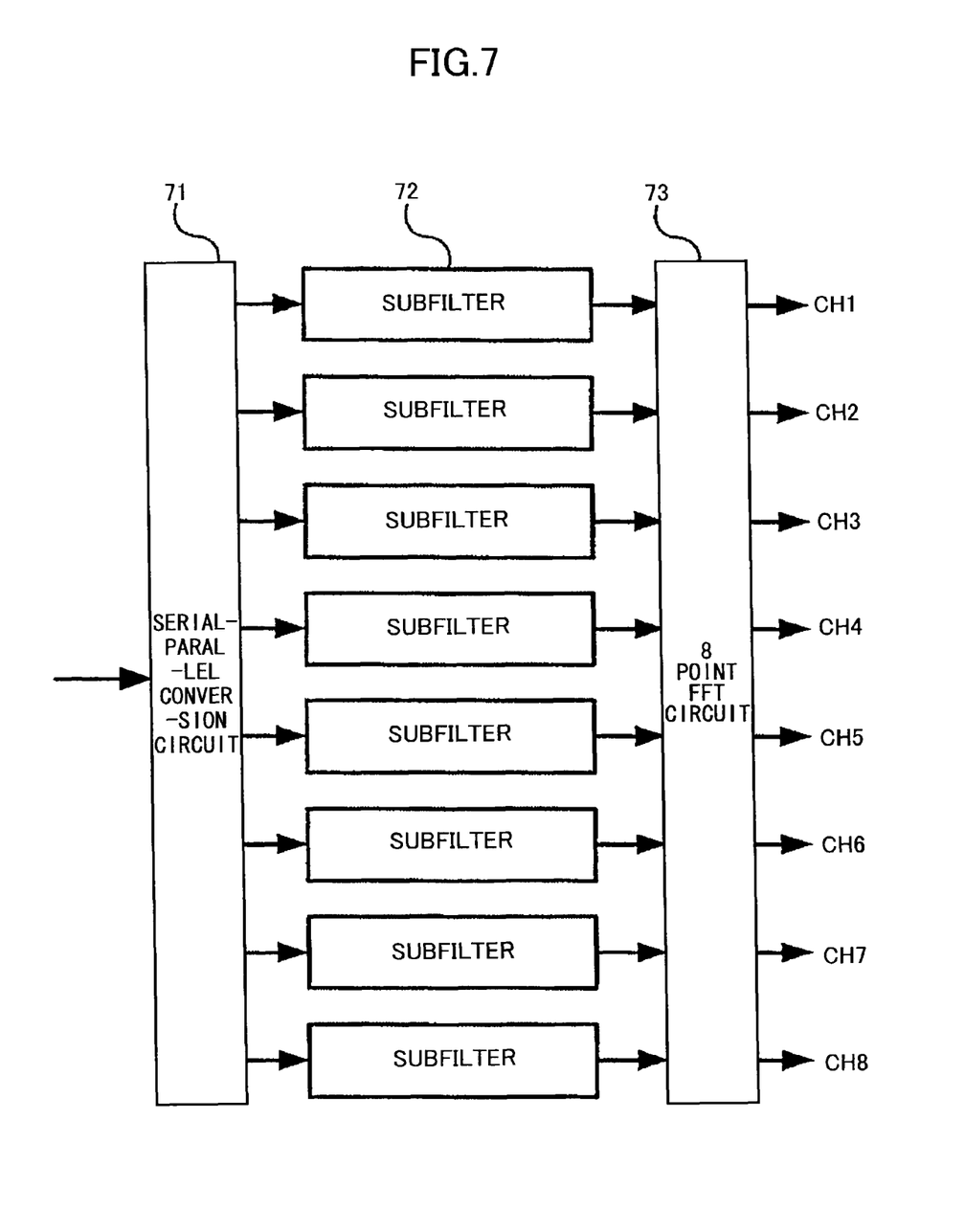
FIG. 7 is a block diagram of a digital signal demultiplexing apparatus based on a conventional technique.

FIG. 7 is a block diagram of a digital signal demultiplexing apparatus based on the principle described in the non-patent document 1. FIG. 7 shows a configuration for demultiplexing and outputting 8 channels at the maximum, and the configuration is provided with a serial-parallel conversion circuit 71, eight subfilters 72 and an 8 point discrete Fourier transform circuit 73. The eight subfilters 72 are FIR (Finite Impulse Response) filters that are obtained by polyphase-decomposing a same original filter into eight types, and are identical in bandwidth, but are different in delay time.

First, an input signal into the digital signal demultiplexing apparatus is serial-to-parallel converted in a ratio of 1 to 8 by the serial-parallel conversion circuit 71. The sampling rate of each of the eight series output samples of the serial-parallel conversion circuit 71 is ⅛ of that of the input signal, and each of the samples is filtered by the subfilter 72 and is output. Output samples of eight series from the subfilters 72 are input to each point of the 8 point discrete Fourier transform circuit 73 so that the output samples are discrete Fourier transformed and output by eight samples.

Figure 9:
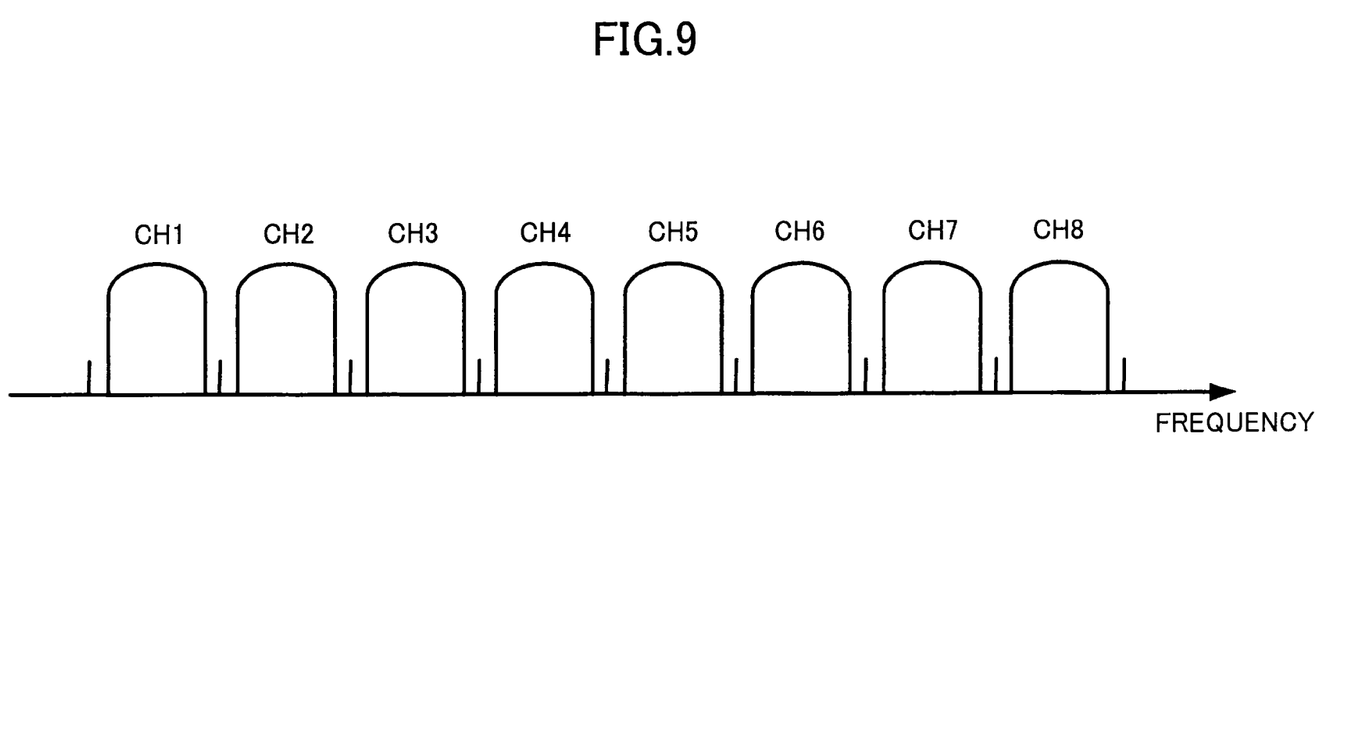
FIG. 9 is a diagram showing signals that can be processed by the conventional apparatus.

FIG. 9 is a diagram showing signals to be processed by the digital signal demultiplexing apparatus shown in FIG. 7. The bandwidth of each channel is the same as a bandwidth of a prototype filter before polyphase-decomposed to subfilters 72, and each center frequency is provided as a frequency corresponding to each output of the 8 point discrete Fourier transform circuit 73, that is, provided as fc(i)=(Fs/8)(i−1). In this equation, fc(i) is a center frequency of channel CHi (i is an integer from 1 to 8), and Fs is a sampling frequency of an input signal to the digital signal demultiplexing apparatus.

Figure 8:
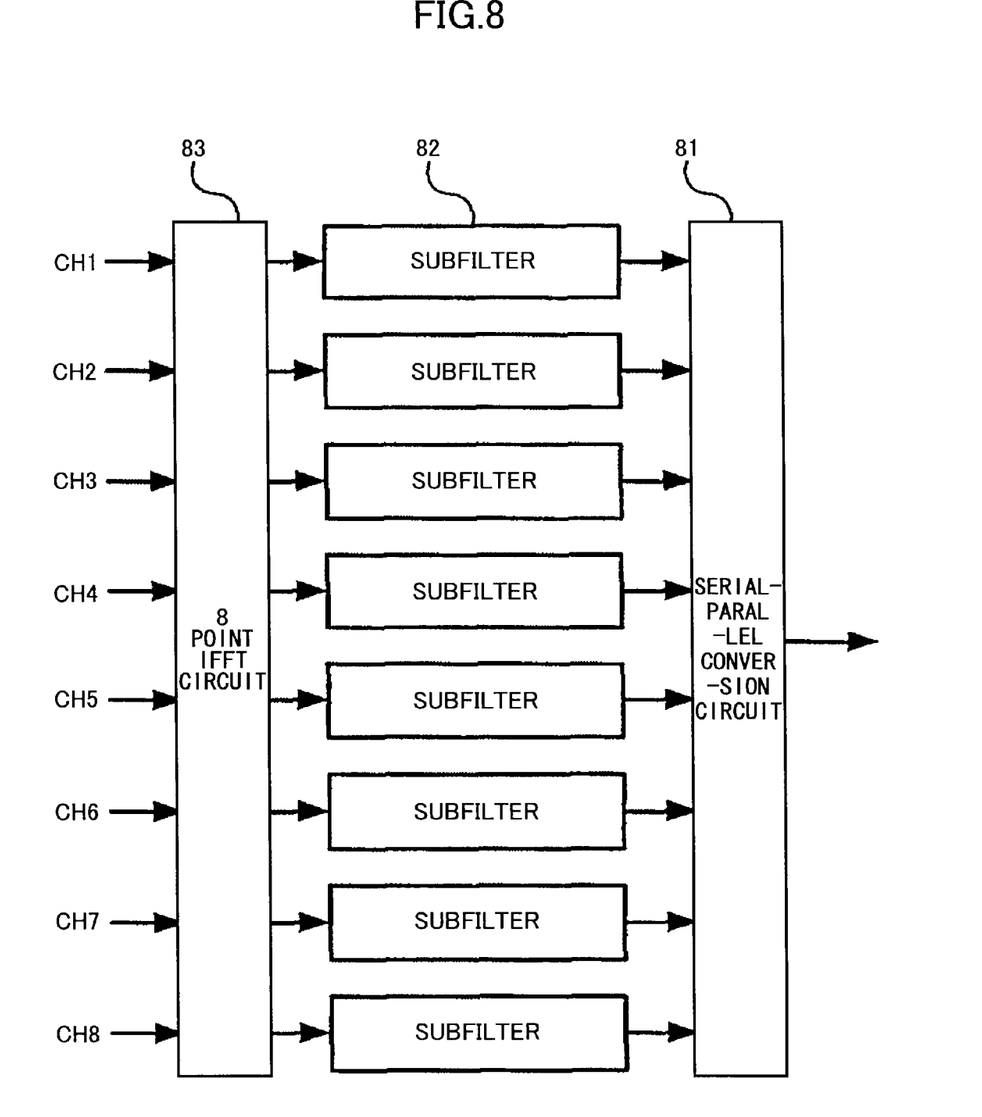
FIG. 8 is a block diagram of a digital signal multiplexing apparatus based on a conventional technique.

FIG. 8 is a block diagram of a digital signal multiplexing apparatus based on the principle described in the non-patent document 1. FIG. 8 shows a configuration for multiplexing and outputting eight channels at the maximum, and the configuration is provided with a parallel-serial conversion circuit 81, eight subfilters 82 and an 8 point discrete inverse Fourier transform circuit 83. The eight subfilters 82 are the same as the 8 subfilters 72 shown in FIG. 7.

Signals from each channel are input to each point of the 8 point discrete inverse Fourier transform circuit 83 so as to be discrete inverse Fourier transformed. Each output of the 8 point discrete inverse Fourier transform circuit is filtered by the subfilter 82 so that a filtered signal is output, and further, output signals are parallel-to-serial converted in a ratio of 8 to 1 by the parallel-serial conversion circuit 81. Sampling rate at the output of the parallel-serial conversion circuit 81 is eight times that of each input signal, and the signal of the rate is output from the digital signal multiplexing apparatus. According to the above-mentioned configurations, like the digital signal demultiplexing apparatus of FIG. 7, a frequency-multiplexed signal as shown in FIG. 9 is output.

Figure 11:
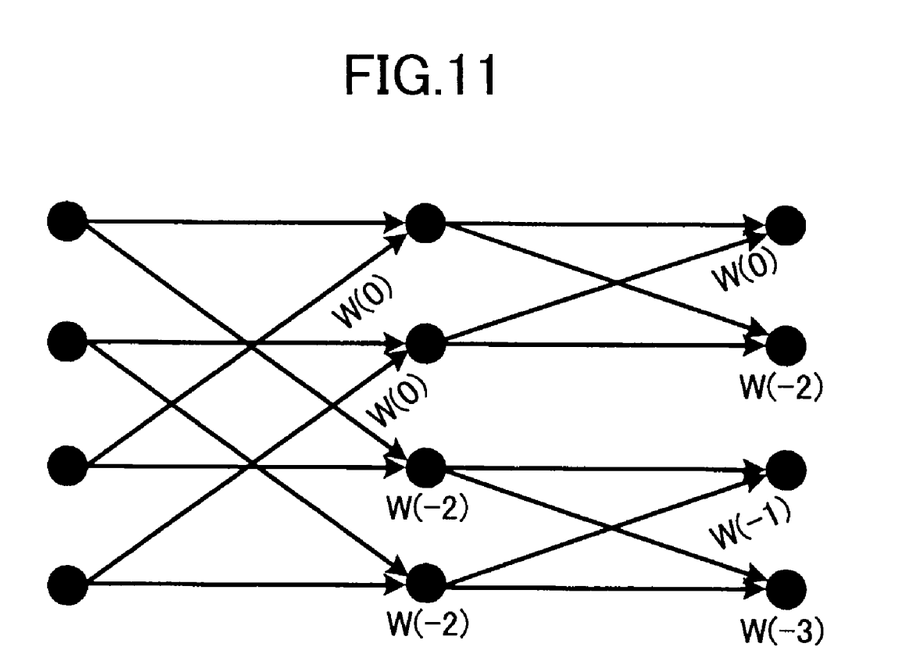
FIG. 11 is a signal flow graph of fast Fourier inverse transform.

In addition, the non-patent document 2 is a document on fast Fourier transform and fast Fourier inverse transform. As is well known, fast Fourier transform and inverse transform are realized by applying butterfly computation onto an input signal repeatedly. Processing flow for this computation follows a signal flow graph as shown in pages 153-158 of the non-patent document 2. An example of a signal flow graph of fast Fourier inverse transform (8 point) is shown in FIG. 11. W(k) (k=0, −1, −2, . . . , −(N/2)+1: N is a number of points) is called a rotation factor, and is a complex number represented by the following equation.

$$W(k) = e^{j\frac{2\pi k}{N}}$$

Nodes indicated by black circles represent input signals and results calculated from the input signals. These are input to next nodes according to the direction of the arrows. When a rotation factor is shown at a lower part of the arrow, a signal is multiplied by the rotation factor, and addition or subtraction between signals is carried out at a point where arrows merge.

[Non Patent document 1] F. Takahata, et. al., "A PSK Group Modem Based on Digital Signal Processing: Algorithm, Hardware Design, Implementation and Performance", International Journal of Satellite Communications, Vol. 6, pp. 253-266, 1988

[Non Patent document 2] Bringham E. Oran, "Fast Fourier Transform", Prentice-Hall, Inc. 1974

DISCLOSURE OF THE INVENTION

Problem to be Solved by the Invention

Figure 10:
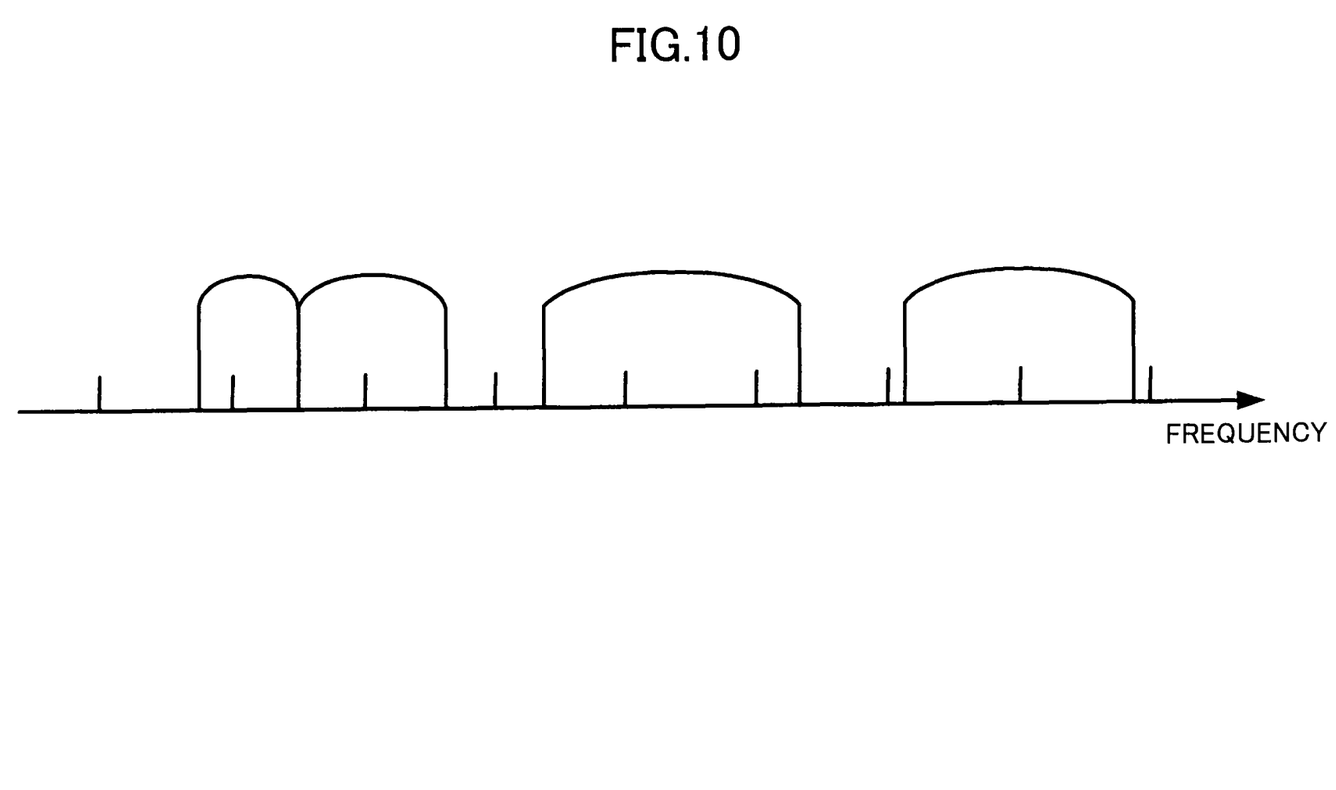
FIG. 10 is a diagram showing signals that cannot be processed by the conventional apparatus.

As to the conventional digital signal demultiplexing apparatus and the digital signal multiplexing apparatus, there is a problem in that demultiplexing and multiplexing cannot be performed unless signals of every channel are the same as the bandwidth of the prototype filter and the center frequencies are located at regular intervals. FIG. 10 shows an example of channels for which conventional apparatuses cannot perform processing. As mentioned above, it is not possible for the conventional apparatuses to demultiplex or multiplex channels in which bandwidths are different and channels in which center frequencies are located at irregular intervals.

Therefore, an object of the present invention is to provide a digital signal demultiplexing apparatus that can demultiplex a signal of channels having arbitrary frequency intervals and bandwidths, and a digital signal multiplexing apparatus that can multiplex signals of channels having arbitrary frequency intervals and bandwidths.

Means for Solving the Problem

The digital signal demultiplexing apparatus of the present invention is a digital signal demultiplexing apparatus for demultiplexing an input signal in which signals of a plurality of channels are frequency-multiplexed, including:

first means configured to perform discrete Fourier transform on the input signal to output samples of the frequency domain;

second means configured to output samples existing within a frequency band of each channel from the samples of the frequency domain;

third means configured to add samples such that a number of samples of each channel becomes a power of two; and fourth means configured to perform, on the samples of each channel made to be the power of two, discrete inverse Fourier transform of a length that is the same as the number of the samples.

According to another embodiment of the digital signal demultiplexing apparatus of the present invention, it is preferable that the digital signal demultiplexing apparatus includes:

means configured to store coefficients for waveform shaping; and fifth means configured to multiply an output signal of any one of the first means, the second means and the third means by the coefficients.

In addition, according to another embodiment of the digital signal demultiplexing apparatus of the present invention, it is preferable that the fourth means includes:

butterfly computation means configured to perform butterfly computation;

memory means configured to store butterfly computation results; and control means configured to control a number of times of butterfly computation in the butterfly computation means and control butterfly computation results to be input to the butterfly computation means from the memory means according to a length of discrete inverse Fourier transform.

In addition, according to another embodiment of the digital signal demultiplexing apparatus of the present invention, it is preferable that any one of the second means, the third means, the fourth means and the fifth means processes the signals of the plurality of channels in a time division manner.

The digital signal multiplexing apparatus of the present invention is a digital signal multiplexing apparatus for frequency-multiplexing signals of a plurality of channels to output a frequency-multiplexed signal, including:

sixth means configured to perform, on each of input signals of each channel of a predetermined period, discrete Fourier transform of a length that is the same as a number of samples of the input signal so as to output samples of the frequency domain;

seventh means configured to output samples existing within a frequency band of each channel from the samples of the frequency domain of each channel;

eighth means configured to arrange the samples existing within the frequency band of each channel according to frequency assignment of each channel; and ninth means configured to perform discrete inverse Fourier transform on the samples arranged according to the frequency assignment of each channel.

According to another embodiment of the digital signal multiplexing apparatus of the present invention, it is preferable that the digital signal multiplexing apparatus includes:

means configured to store coefficients for waveform shaping; and tenth means configured to multiply output signals of any one of the sixth means, the seventh means and the eighth means by the coefficients.

In addition, according to another embodiment of the digital signal multiplexing apparatus of the present invention, it is preferable that the sixth means includes:

butterfly computation means configured to perform butterfly computation;

memory means configured to store butterfly computation results; and control means configured to control a number of times of butterfly computation in the butterfly computation means and control butterfly computation results to be input to the butterfly computation means from the memory means according to a length of discrete Fourier transform.

In addition, according to another embodiment of the digital signal multiplexing apparatus of the present invention, it is preferable that any one of the sixth means, the seventh means and the tenth means processes the signals of the plurality of channels in a time division manner.

Effect of the Invention

The digital signal demultiplexing apparatus of the present invention transforms the whole of the input signal into samples of the frequency domain by discrete Fourier transform and extracts samples from regions to be demultiplexed so as to perform demultiplexing in the frequency domain first. After that, the apparatus outputs samples of the time domain that are demultiplexed by performing discrete inverse Fourier transform for each channel. According to this configuration, it becomes possible to demultiplex signals of arbitrary bandwidth existing in arbitrary frequencies to output the signals as individual time domain signals. In the process, the length of discrete inverse Fourier transform may be a length corresponding to bandwidth of each channel. Thus, the narrower the band of the channel is, the shorter the length of the discrete inverse Fourier transform can be set. The narrower the band of each channel is, the greater the number of channels to be handled by the digital signal demultiplexing apparatus may become. But, the size of the apparatus can be kept small irrespective of channel assignment by making the length of the discrete inverse Fourier transform to be variable to change the length according to channel bandwidth.

In addition, by setting samples of the frequency domain extracted for each channel to be consistent with a power of two, fast inverse Fourier transform can be applied so that the size of the apparatus can be further reduced. In addition, by performing waveform shaping for signals of the frequency domain, it becomes unnecessary to perform convolution calculation that requires many multipliers and memory elements such as FIR filters in the time domain and IIR (Infinite Impulse Response) filters, the size of apparatuses connected to subsequent stages can be reduced.

The digital signal multiplexing apparatus of the present invention transforms each of input signals of each channel into samples of the frequency domain by discrete Fourier transform, and arranges samples of each channel according to frequency assignment so as to perform multiplexing in the frequency domain first. After that, the apparatus performs discrete inverse Fourier transform on the whole signals to output frequency-multiplexed time domain signals. According to this configuration, signals of arbitrary bandwidths can be frequency-multiplexed to arbitrary frequencies and output. In the process, the length of discrete Fourier transform may be a length the same as the number of samples of each channel for a predetermined period. Thus, the narrower the band of the channel is, the shorter the length of the discrete Fourier transform can be set. The narrower the band of each channel is, the greater the number of channels to be handled by the digital signal multiplexing apparatus may become. But, the size of the apparatus can be kept small irrespective of channel assignment by making the length of the discrete Fourier transform to be variable to change the length according to channel bandwidth.

The variable length discrete inverse Fourier transform and discrete Fourier transform are realized by providing butterfly computation means for outputting and inputting computation results to and from a memory, and controlling the number of times of butterfly computation and inputs from the memory when performing the computation. According to this configuration, Signals of various kinds of bandwidths can be processed using one circuit, so that the size of the apparatus can be further reduced. In addition, by applying time division processing to at least one of the second to fifth means and to at least one of the sixth, seventh and tenth means, the size of the apparatus can be further reduced.

In addition, by multiplying the samples of the frequency domain transformed for each channel by the coefficients for waveform shaping, the transmission spectrum can be band-restricted to obtain a desired shape. Accordingly, it is only necessary to perform gradual band restriction in a modulation apparatus and the like connected in a front stage of the present invention, so that the size of the front stage apparatus can be reduced.

DESCRIPTION OF REFERENCE SIGNS 11, 71 serial-parallel conversion circuit
12 64 point discrete Fourier transform circuit
13 64 to 1 selector
14 channel extrapolation circuit
15, 25 filter characteristic table
16, 26 multiplier
17 64 point variable length discrete inverse Fourier transform circuit
18 1 to 8 selector
19, 29 FIFO
22 64 point discrete inverse Fourier transform circuit
23 1 to 64 selector
24 channel cutout circuit
27 64 point discrete Fourier transform circuit
28 8 to 1 selector
72 subfilter
73 8 point discrete Fourier transform circuit
82 subfilter
83 8 point discrete inverse Fourier transform circuit
171, 271 memory
172, 272 butterfly computation circuit
173, 273 control circuit

PREFERRED EMBODIMENTS FOR CARRYING OUT THE INVENTION

In the following, preferred embodiments for carrying out the present invention are described in detail by referring to drawings.

Figure 1:
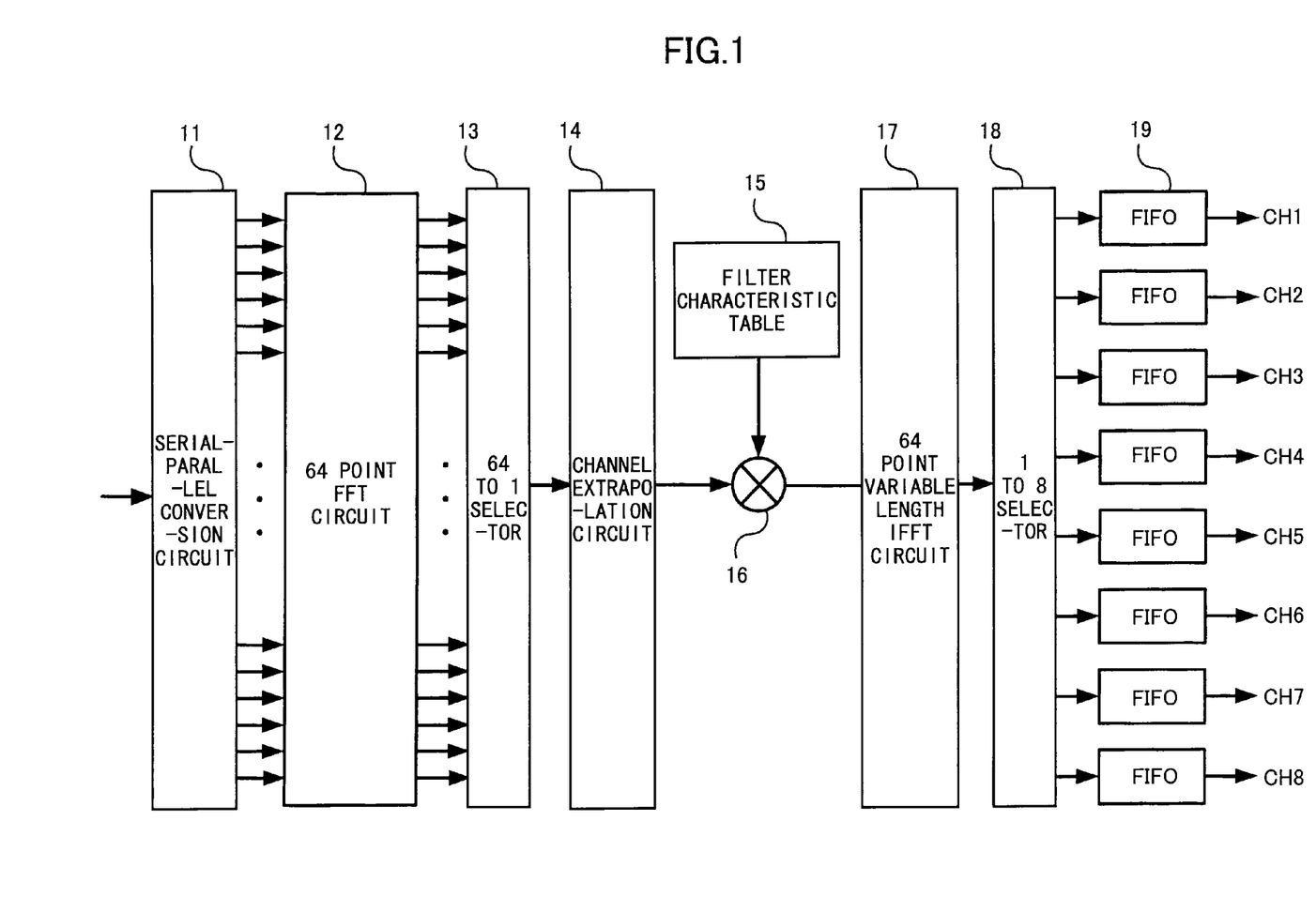
FIG. 1 is a block diagram of a digital signal demultiplexing apparatus according to the present invention.

FIG. 1 is a block diagram of a digital signal demultiplexing apparatus according to the present invention, and shows a configuration for demultiplexing and outputting signals of eight channels at the maximum. As shown in FIG. 1, the digital signal demultiplexing apparatus includes a serial-parallel conversion circuit 11, a 64 point discrete Fourier transform circuit 12, 64 to 1 selector 13, a channel extrapolation circuit 14, a filter characteristic table 15, a multiplier 16, a 64 point variable length discrete inverse Fourier transform circuit 17, a 1 to 8 selector 18, and FIFO (First-In First-Out) 19 for each channel.

The serial-parallel conversion circuit 11 performs serial-parallel conversion in a ratio of 1 to 64 on each sample of an input signal, to the digital signal demultiplexing apparatus, in which signals of a plurality of channels are frequency-multiplexed, the 64 point discrete Fourier transform circuit 12 performs discrete Fourier transform processing by 64 samples for each sample input from the serial-parallel conversion circuit 11 to convert the samples to signals of the frequency domain of 64 samples. Each sample output by the 64 point discrete Fourier transform circuit 12 corresponds to a particular frequency, so that the 64 to 1 selector 13 selects only samples existing within a frequency band of a channel to be demultiplexed to output selected samples sequentially for time division processing.

The channel extrapolation circuit 14 adds samples of value 0 to samples output by the 64 to 1 selector 13 such that the number of samples becomes a power of two for each channel. For example, when channels to be demultiplexed are two that are a channel A and a channel B and 13 samples are included within a frequency band of the channel A and 30 samples are included within a frequency band of the channel B in 64 samples output by the 64 point discrete Fourier transform circuit 12, the 64 to 1 selector 13 outputs the 13 samples included in the channel A and 30 samples included in the channel B from the 64 points, and the channel extrapolation circuit 14 adds three samples of value 0 for the channel A to output 16 samples in total, and adds two samples of value 0 for the channel B to output 32 samples in total.

The filter characteristic table 15 has coefficients for waveform shaping. The output of the channel extrapolation circuit 14 is multiplied by the coefficients output from the filter characteristic table 15 in the multiplier 16 so that waveform shaping is performed. Taking a typical roll-off transmission system that equally allocates the roll-off characteristic to transmitter and receiver as an example, each coefficient of the filter characteristic table 15 is set so as to output a root cosine roll-off waveform. By the way, this multiplication may be performed at any position as long as it is performed after the signal is converted to the frequency domain signal.

The 64 point variable length discrete inverse Fourier transform circuit 17 performs, for each channel to be demultiplexed, discrete inverse Fourier transform of a length, that is, a number of points the same as the number of samples of the channel to output sample signals of time domain for each channel. For example, for the channel A for which the channel extrapolation circuit 14 outputs 16 samples, the 64 point variable length discrete inverse Fourier transform circuit 17 performs discrete inverse Fourier transform of 16 points. For the channel B for which the channel extrapolation circuit 14 outputs 32 points, the 64 point variable length discrete inverse Fourier transform circuit 17 performs discrete inverse Fourier transform of 32 points.

The 1 to 8 selector 18 writes time-series signals for each channel output by the 64 point variable length discrete inverse Fourier transform circuit 17 into FIFOs 19 provided for each channel. The signals that are written into FIFOs 19 are sequentially read at a rate according to a bandwidth of a corresponding channel so that the output signal becomes an output of the digital signal demultiplexing apparatus.

Figure 2:
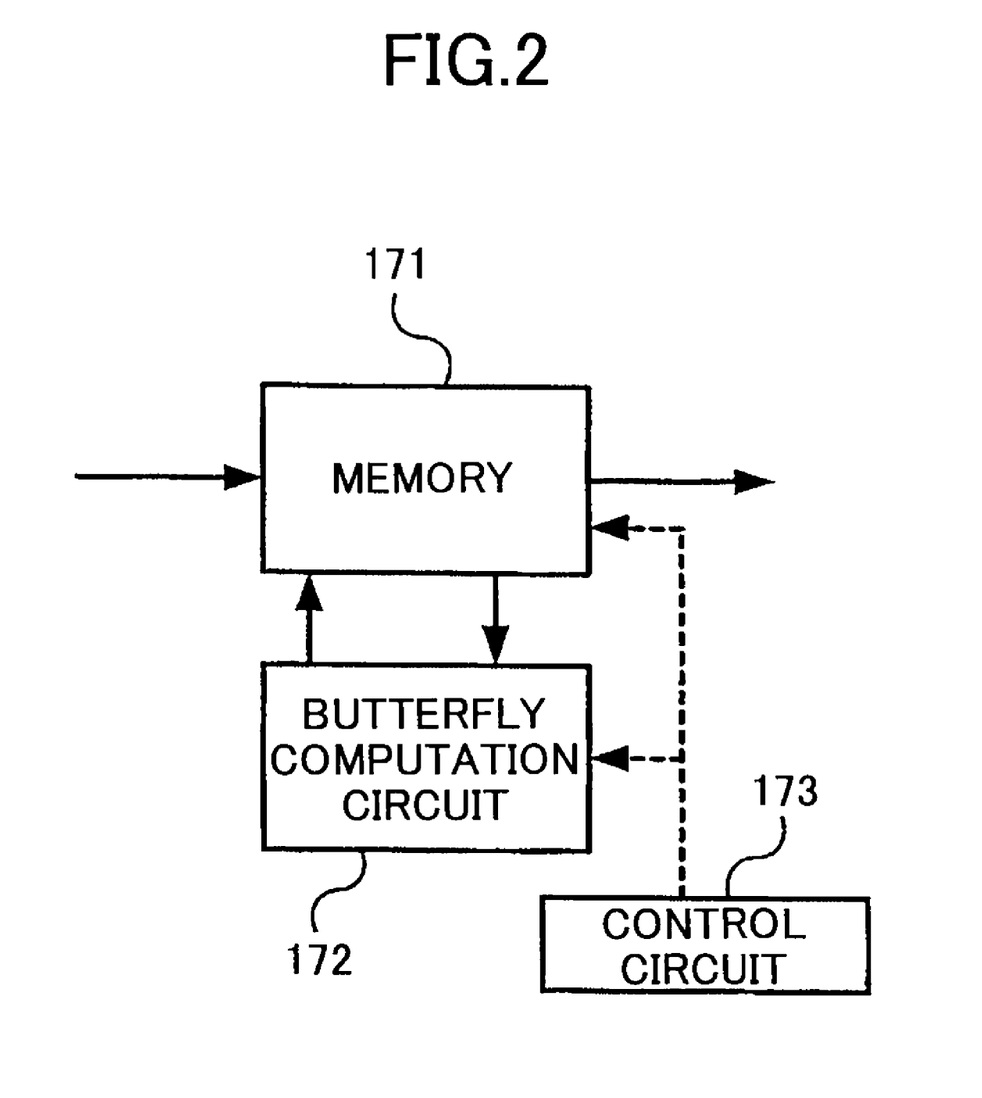
FIG. 2 is a block diagram of a 64 point variable length discrete inverse Fourier transform circuit.

FIG. 2 is a block diagram of the 64 point variable length discrete inverse Fourier transform circuit 17. As shown in FIG. 2, the 64 point variable length discrete inverse Fourier transform circuit 17 includes a memory 171, a butterfly computation circuit 172, and a control circuit 173. The butterfly computation circuit 172 performs butterfly computation on signals from the memory 171 to write the computation results into the memory 171. As shown in FIG. 11, fast inverse Fourier transform can be realized by applying butterfly computation repeatedly. The control circuit 173 controls the number of times of repetition of butterfly computation and controls inputs to the butterfly computation circuit 172 from the memory 171 when performing repeated computation according to the number of points to be applied so as to realize fast inverse Fourier transform in variable lengths such as 64, 32, 16, 8 and 4 points.

Figure 3:
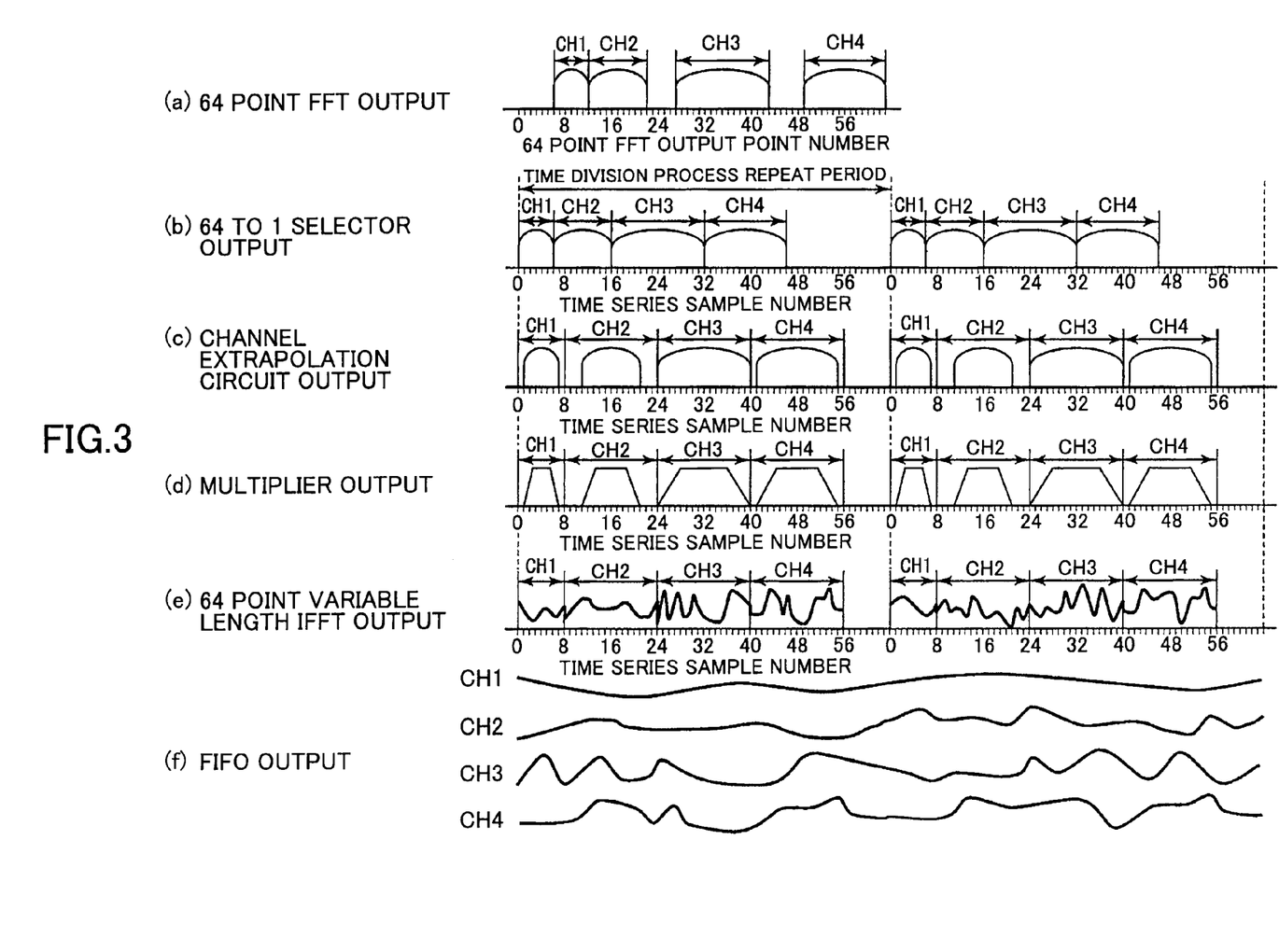
FIG. 3 is a diagram showing signals in each part of the digital signal demultiplexing apparatus.

FIG. 3 shows signals in each part of the digital signal demultiplexing apparatus when the digital signal demultiplexing apparatus shown in FIG. 1 demultiplexes a signal in which signals of four channels of CH1-CH4 having the same frequency assignment as that shown in FIG. 10 are frequency-multiplexed. The 64 to 1 selector 13 sequentially selects only samples within a bandwidth of each channel from the 64 samples output by the 64 point discrete Fourier transform circuit 12 shown in FIG. 3(a) so as to output the samples as frequency domain signals arranged in time series. As a result, signals output by the 64 to 1 selector 13 become those as shown in FIG. 3(b). After that, until the signals are input to the FIFOs 19, processes are performed in a time division manner in which 64 samples output by the 64 point discrete Fourier transform circuit 12 correspond to one period.

The channel extrapolation circuit 14 extrapolates samples of value 0 such that the number of samples of each channel becomes a power of two. As a result, signals output by the channel extrapolation circuit 14 become those shown in FIG. 3(c). By the way, in the present process, since samples of 0 are extrapolated merely in the outside of the signal spectrum in the frequency domain, the present process does not affect the length of the waveform in the time domain. However, since the number of samples increases as a result of extrapolation, it is necessary to select the repetition period for time division processing such that the repetition period becomes greater than the total number of samples of the result of extrapolation.

The multiplier 16 performs waveform shaping by multiplying the output of the channel extrapolation circuit 14 by the output of the filter characteristic table 15, so that the output signals become as shown in FIG. 3(d). The 64 point variable length discrete inverse Fourier transform circuit 17 performs, for each channel, fast inverse Fourier transform having transform points the number of which is the same as the number of samples of the channel. In FIG. 3, fast inverse Fourier transform of 8 points is performed for CH1, and fast inverse Fourier transform of 16 points is performed for each of CH2-CH4. As shown in FIG. 3(e), the output signals of the 64 point variable length discrete inverse Fourier transform circuit 17 are time domain signals, and each sample corresponds to a channel. The 1 to 8 selector 18 writes each sample of time domain shown in FIG. 3(e) into the FIFO 19 of a corresponding channel, so that the signals written in the FIFO 19 are read at a rate according to a bandwidth of the corresponding channel as shown in FIG. 3(f).

Figure 4:
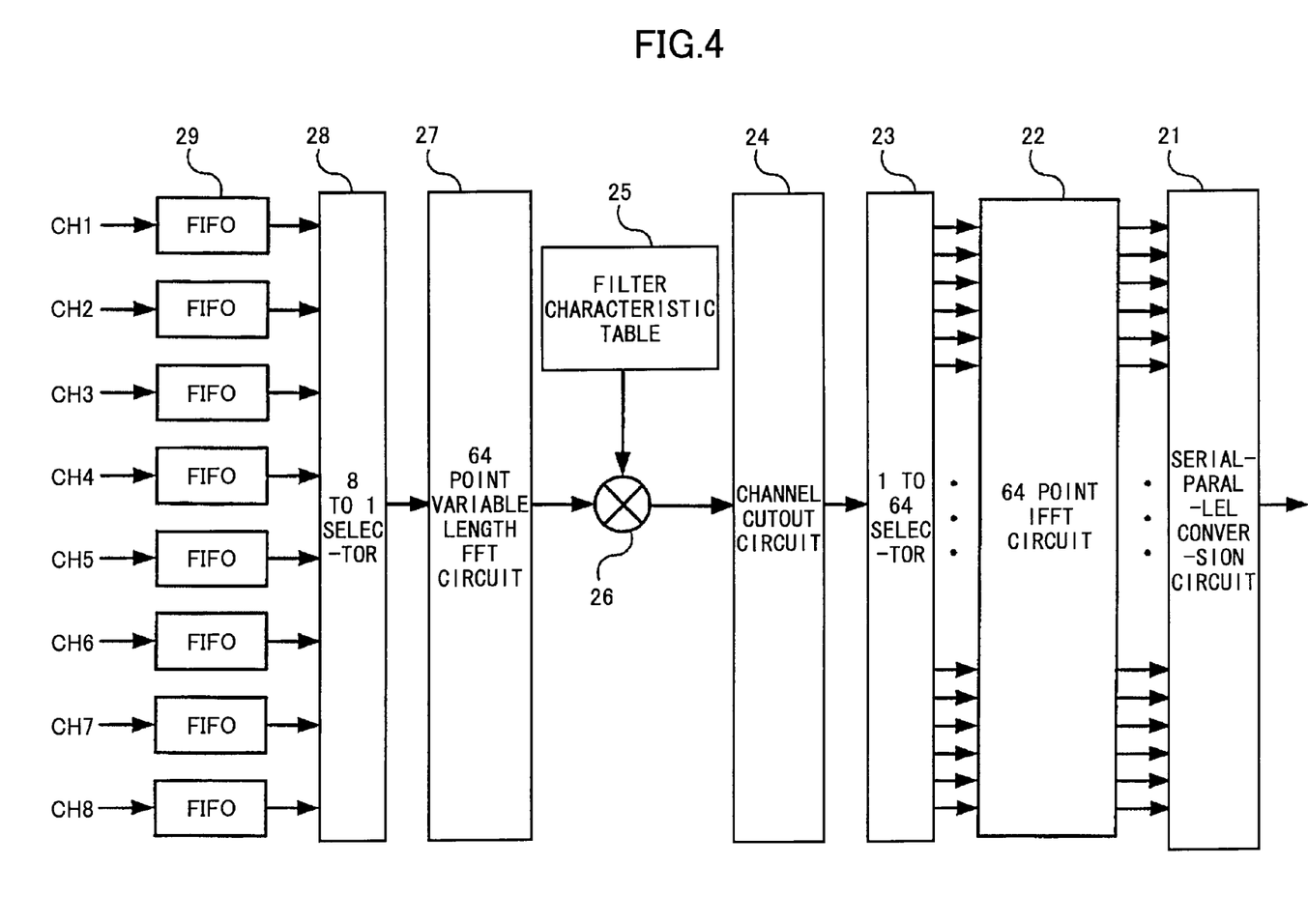
FIG. 4 is a block diagram of a digital signal multiplexing apparatus of the present invention.

FIG. 4 is a block diagram of the digital signal multiplexing apparatus of the present invention, and shows a configuration for frequency-multiplexing signals of eight channels at the maximum to output a multiplexed signal. As shown in FIG. 4, the digital signal multiplexing apparatus includes a parallel-serial transform circuit 21, a 64 point discrete inverse Fourier transform circuit 22, a 1 to 64 selector 23, a channel cutout circuit 24, a filter characteristic table 25, a multiplier 26, a 64 point variable length discrete Fourier transform circuit 27, a 8 to 1 selector 28, and FIFO 29 for each channel.

The signals of each channel that are input signals to the digital signal multiplexing apparatus are written into corresponding FIFOs 29 at a rate corresponding to a bandwidth of each channel. For each predetermined period, the 8 to 1 selector 28 sequentially selects FIFOs, from the FIFOs 29, corresponding to channels to be multiplexed, reads samples stored in the selected FIFOs 29 at a high rate in chronological order for time division processing, and outputs the samples to the 64 point variable length discrete Fourier transform circuit.

The 64 point variable length discrete Fourier transform circuit 27 performs, for each of channels to be multiplexed, discrete Fourier transform corresponding to the length, that is, the number of samples so as to output frequency domain signals. The filter characteristic table 25 includes coefficients for waveform shaping. Coefficients output by the filter characteristic table 25 and outputs of the 64 point variable length discrete Fourier transform circuit 27 are multiplied together by the multiplier 26 so that waveform shaping is performed. Taking a typical roll-off transmission system that equally allocates the roll-off characteristic to transmitter and receiver as an example, each coefficient of the filter characteristics table 25 is set so as to output a root cosine roll-off waveform. By the way, this multiplication may be performed at any position as long as it is performed after the signal is converted to a frequency domain signal.

The channel cutout circuit 24 cuts out only samples existing within an occupied bandwidth of each channel to output the samples, and the 1 to 64 selector 23 rearranges each sample output by the channel cutout circuit 24 according to the frequency position of the sample in multiplexed signal so as to input each sample into a corresponding input position of the 64 point discrete inverse Fourier transform circuit 22.

The 64 point discrete inverse Fourier transform circuit 22 performs fast inverse Fourier transform process on the inputs to output time domain signals of 64 samples, and the parallel-serial conversion circuit 21 converts the signals of 64 samples output by the 64 point discrete inverse Fourier transform circuit 22 into serial signals to output frequency multiplexed signals.

Figure 5:
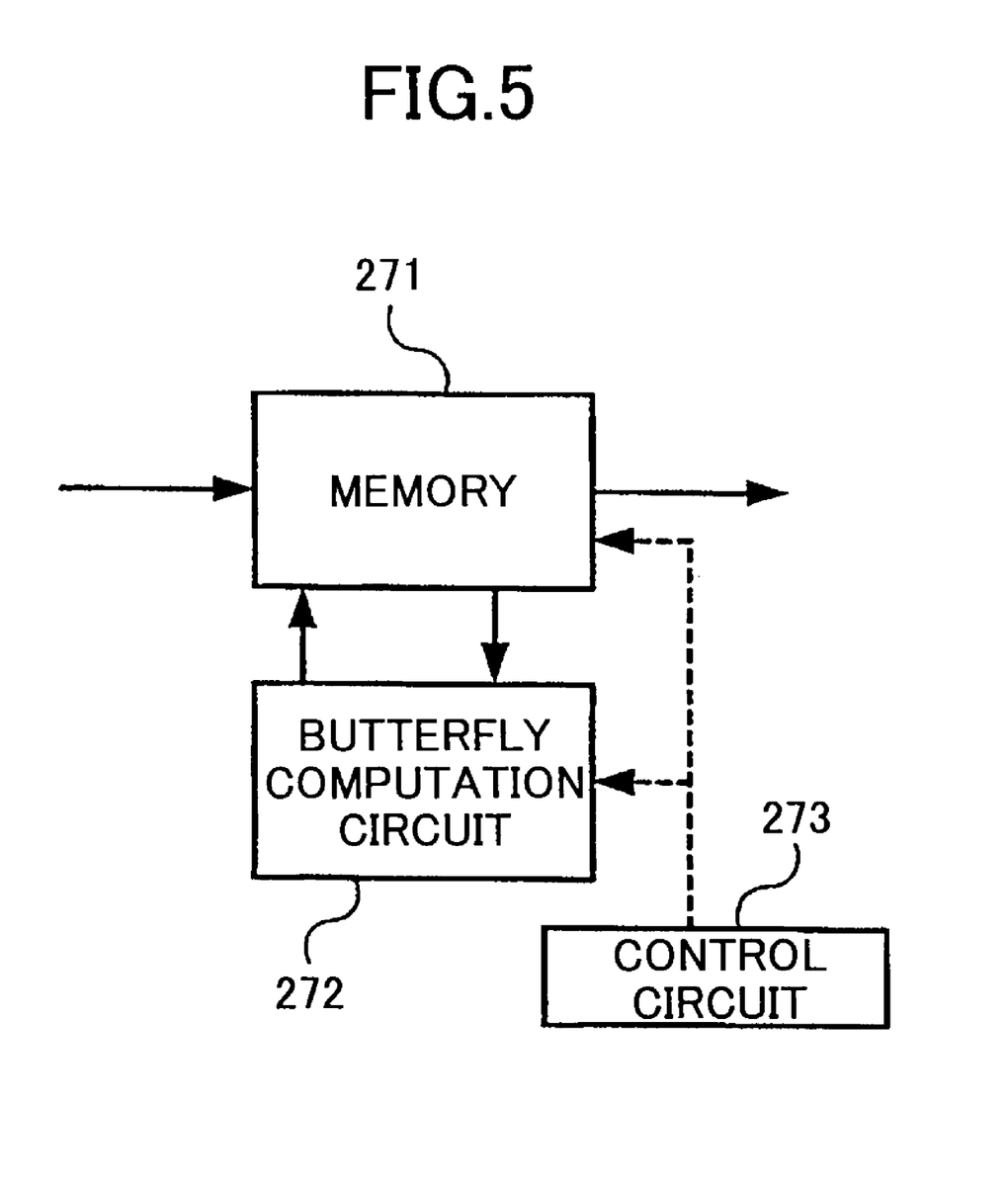
FIG. 5 is a block diagram of a 64 point variable length discrete Fourier transform circuit.

FIG. 5 is a block diagram of the 64 point variable length discrete Fourier transform circuit 27. As shown in FIG. 5, the 64 point variable length discrete Fourier transform circuit 27 includes a memory 271, a butterfly computation circuit 272, and a control circuit 273. The butterfly computation circuit 272 performs butterfly computation for signals from the memory 271 to write results into the memory 271. The control circuit 273 controls the number of times of repetition of butterfly computation and controls inputs to the butterfly computation circuit 272 from the memory 271 when performing repeated computation according to the number of points to be applied so as to realize fast Fourier transform in variable lengths such as 64, 32, 16, 8 and 4 points. By the way, the sign of rotation factor in the butterfly computation in the fast Fourier transform is different from the sign of the rotation factor in the butterfly computation in the fast inverse Fourier transform shown in FIG. 11.

Figure 6:
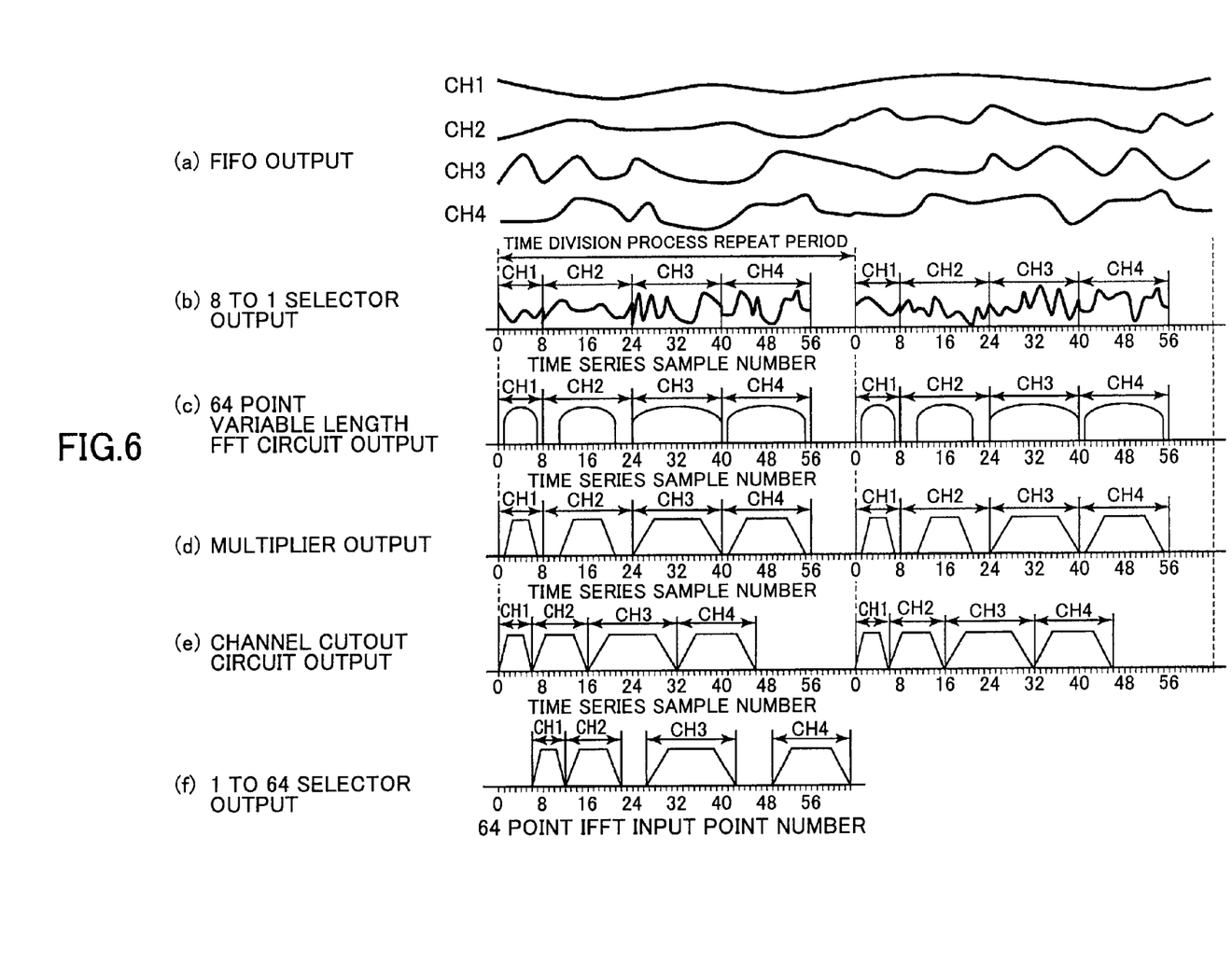
FIG. 6 is a diagram showing signals of each part of the digital signal multiplexing apparatus.

FIG. 6 is a diagram showing signals of each part of the digital signal multiplexing apparatus when performing frequency-multiplexing in the digital signal multiplexing apparatus shown in FIG. 4. Signals of each channel shown in FIG. 6(a) are input to the FIFOs 29. For each division processing repetition period, the 8 to 1 selector 28 sequentially selects FIFOs 29 corresponding to CH1-CH4, and reads signals at high speed to output the signals in chronological order as shown in FIG. 6(b). After that, until signals are input to the 64 point discrete inverse Fourier transform circuit 22, processing is performed every 64 samples in a time division manner in the example shown in FIG. 6.

The 64 point variable length discrete Fourier transform circuit 27 performs fast Fourier transform of a number of points corresponding to the number of samples of each channel for outputs of each channel output by the 8 to 1 selector 28. As a result, signals output by the 64 point variable length discrete Fourier transform circuit 27 become frequency domain signals for each channel arranged in time series as shown in FIG. 6(c). The multiplier 26 multiplies outputs of the 64 point variable length discrete Fourier transform circuit 27 by outputs of the filter characteristic table 25 to perform waveform shaping so that the output signals become signals shown in FIG. 6(d).

The channel cutout circuit 24 cuts out only samples existing within an occupied bandwidth of each channel from samples output by the multiplier 26. As a result, signals output by the channel cutout circuit 24 become as shown in FIG. 6(e). By the way, in the present process, since unnecessary parts of signal spectrum are merely deleted in the frequency domain, the present process does not affect the length of the waveform in the time domain. The 1 to 64 selector 23 outputs each sample to an input position of the 64 point discrete inverse Fourier transform circuit 22 corresponding to a frequency position, in a multiplexed signal, of each sample output by the channel cutout circuit 24. As a result, signals output by the 1 to 64 selector 23 are as shown in FIG. 6(f).

As mentioned above, although an example for demultiplexing/multiplexing eight channels at the maximum in a design of about eight points per channel has been described, the number of channels to be demultiplexed/multiplexed and the number of points of discrete Fourier transform/discrete inverse Fourier transform process is not limited to the example.

In addition, although one butterfly computation circuit 172 or 272 is provided in the 64 point variable length discrete inverse Fourier transform circuit 17 or the 64 point variable length discrete inverse Fourier transform circuit 27, a plurality of butterfly computation circuits 172 or 272 may be provided to perform parallel processing. In addition, each selector may be replaced with a configuration for controlling a memory for storing signals, and controlling writing addresses and reading addresses of the memory so as to perform operation for necessary signal region, and this configuration can be also applied to the channel extrapolation circuit 14, the channel cutout circuit 24.

By the way, for compensating for discontinuity that occurs for each transform unit in signal processing to which discrete Fourier transform is applied, pages 206-213 in the non-patent document 2 describe overlap-add or overlap-save technique to perform two series discrete Fourier transform or discrete Fourier inverse transform, and, while transform regions are being overlapped, combine and use transform outputs related to the overlapping regions. It is preferable to apply this technique to the digital signal demultiplexing apparatus and the digital signal multiplexing apparatus of the present invention.

The present invention is not limited to the specifically disclosed embodiments, and variations and modifications may be made without departing from the scope of the present invention.

The present international application claims priority based on Japanese patent application No. 2006-288612, filed in the JPO on Oct. 24, 2006 and the entire contents of the Japanese patent application No. 2006-288612 is incorporated herein by reference.

The invention claimed is:

1. A digital signal demultiplexing apparatus for demultiplexing an input signal in which signals of a plurality of channels are frequency-multiplexed, comprising:
    a first unit configured to perform discrete Fourier transform on the input signal to output samples of the frequency domain;
    a second unit configured to output, for each channel of the plurality of channels, all samples existing within a frequency band of the respective channel from the samples of the frequency domain, the frequency band corresponding to a frequency and a bandwidth of the respective channel, the plurality of channels including at least one channel having a number of samples different from a number of samples of another channel;
    a third unit configured to add samples such that a number of samples of each channel output from the second unit becomes a power of two;
    a fourth unit configured, for each channel of the plurality of channels, to perform, on the samples of the respective channel made to be the power of two, discrete inverse Fourier transform of a length that is equal to the number of the samples of the respective channel so as to output a time domain signal into a memory corresponding to the respective channel; and
    a fifth unit configured to output a signal of each channel demultiplexed from the input signal by reading out the time domain signal from the memory corresponding to the respective channel at a rate corresponding to the bandwidth of the respective channel.

2. The digital signal demultiplexing apparatus as claimed in claim 1, comprising:
    a shaping unit configured to store coefficients for waveform shaping; and
    a sixth unit configured to multiply an output signal of any one of the first unit, the second unit, and the third unit by the coefficients.

3. The digital signal demultiplexing apparatus as claimed in claim 1 or 2, the fourth comprising:
    a butterfly computation unit configured to perform butterfly computation;
    a memory unit configured to store butterfly computation results; and
    a control unit configured to control a number of times of butterfly computation in the butterfly computation unit and control butterfly computation results to be input to the butterfly computation unit from the memory unit according to a length of discrete inverse Fourier transform.

4. The digital signal demultiplexing apparatus as claimed in claim 1, wherein any one of the second unit, the third unit, the fourth unit and the fifth unit processes the signals of the plurality of channels in a time division manner.

* * * * *